Patented Jan. 8, 1924.

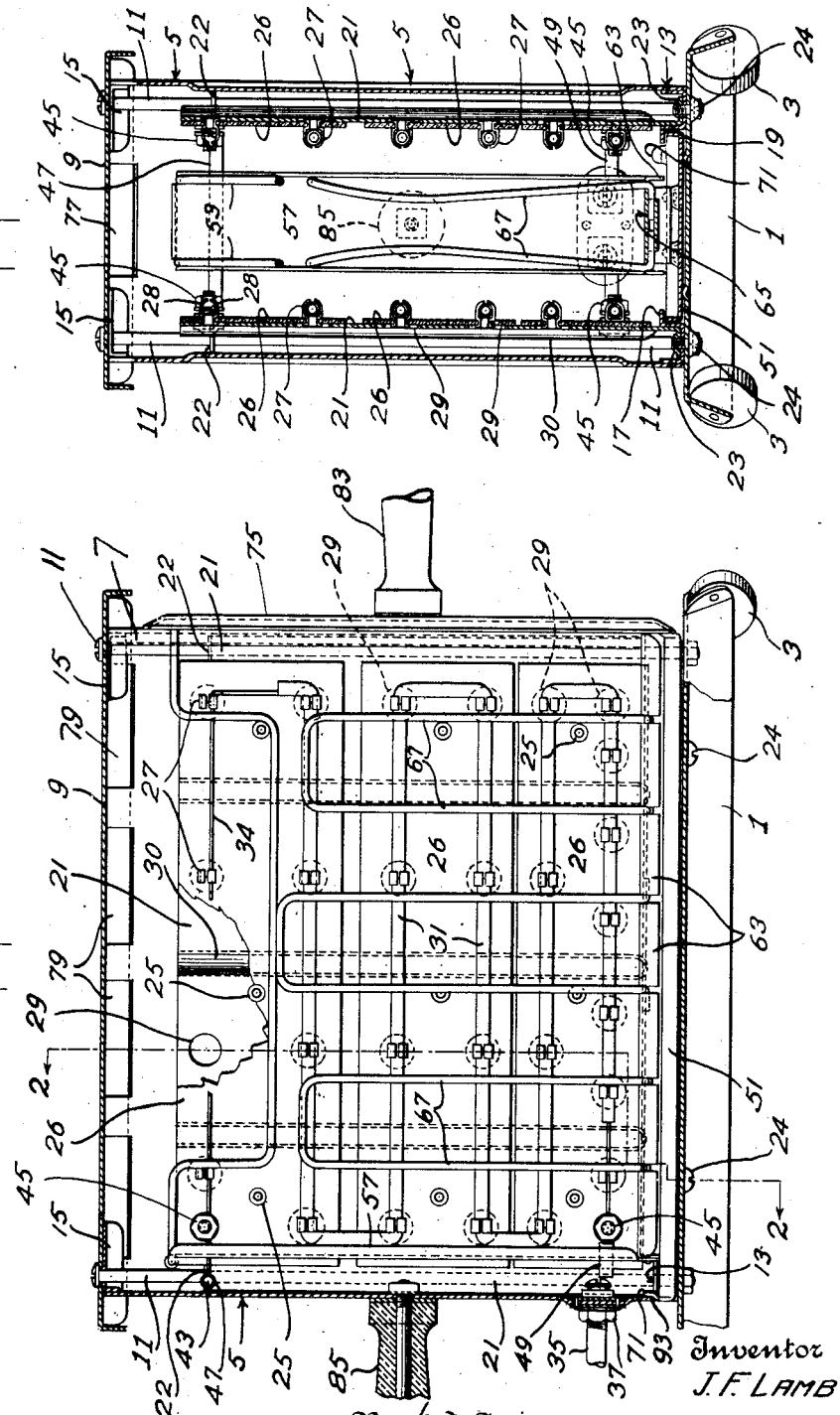

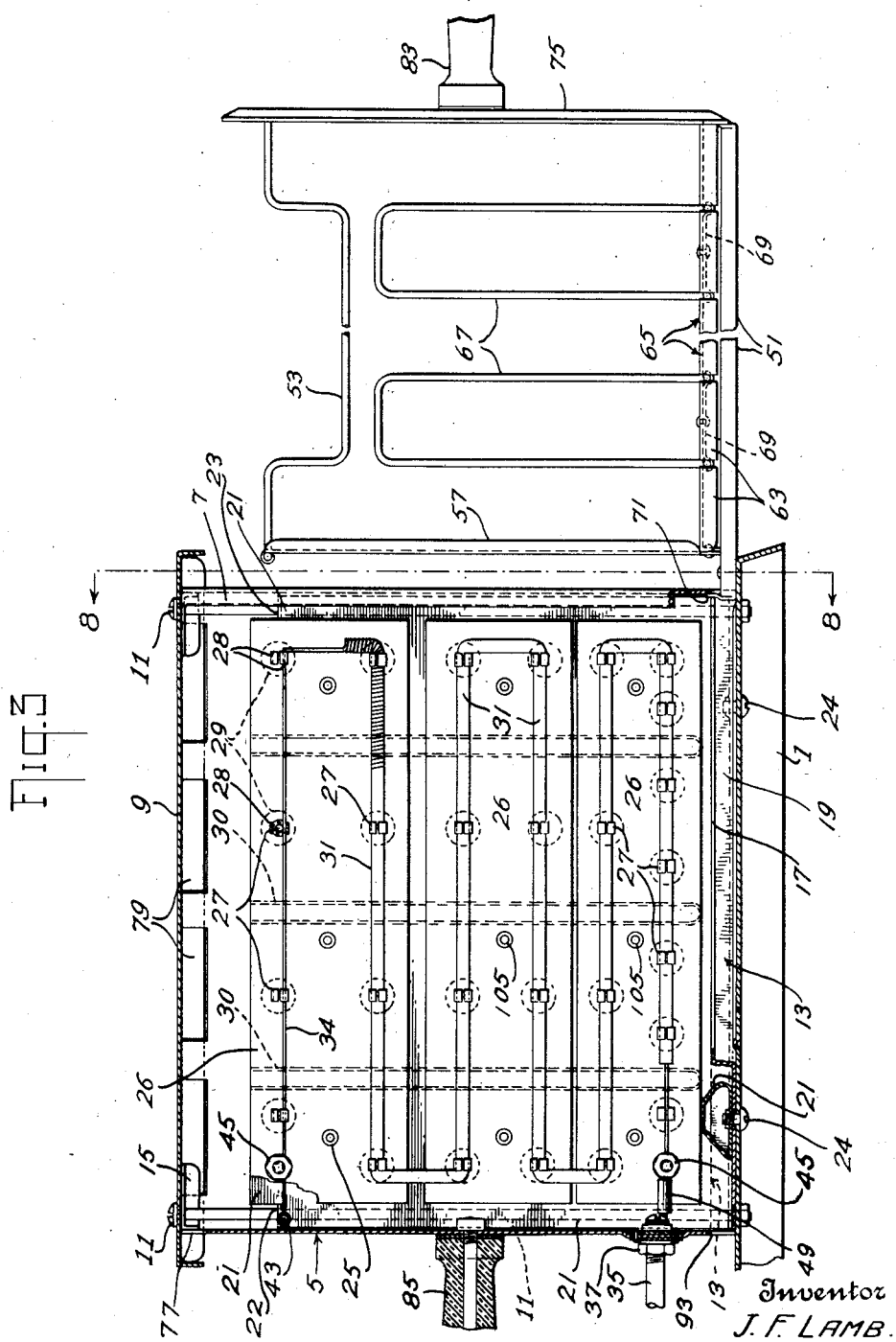

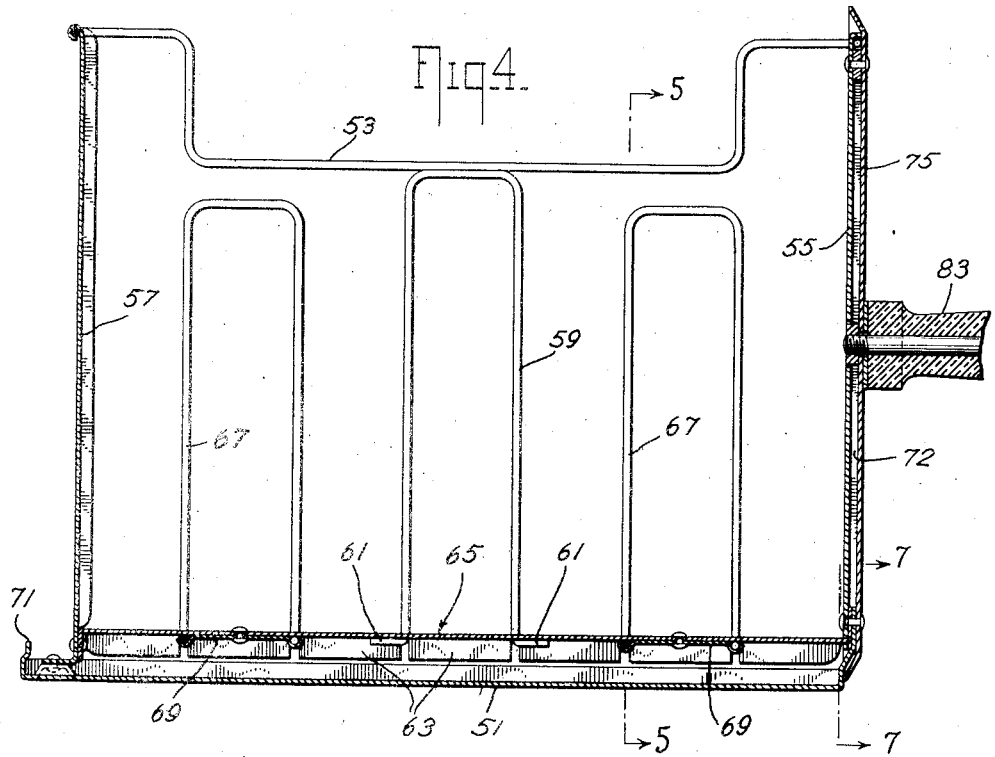
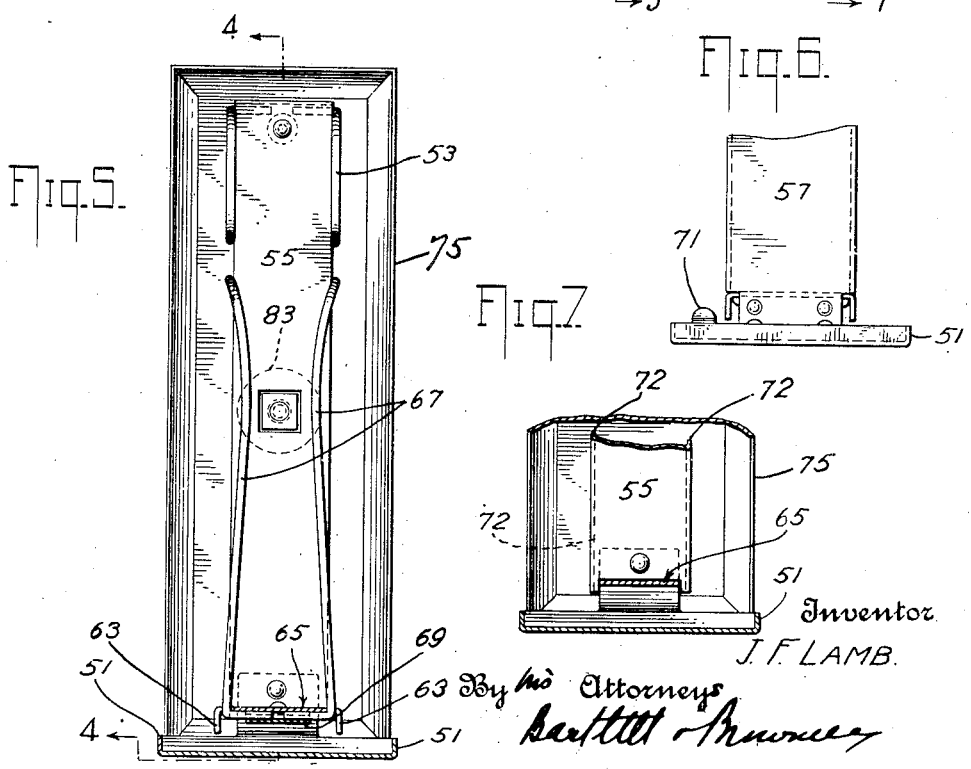

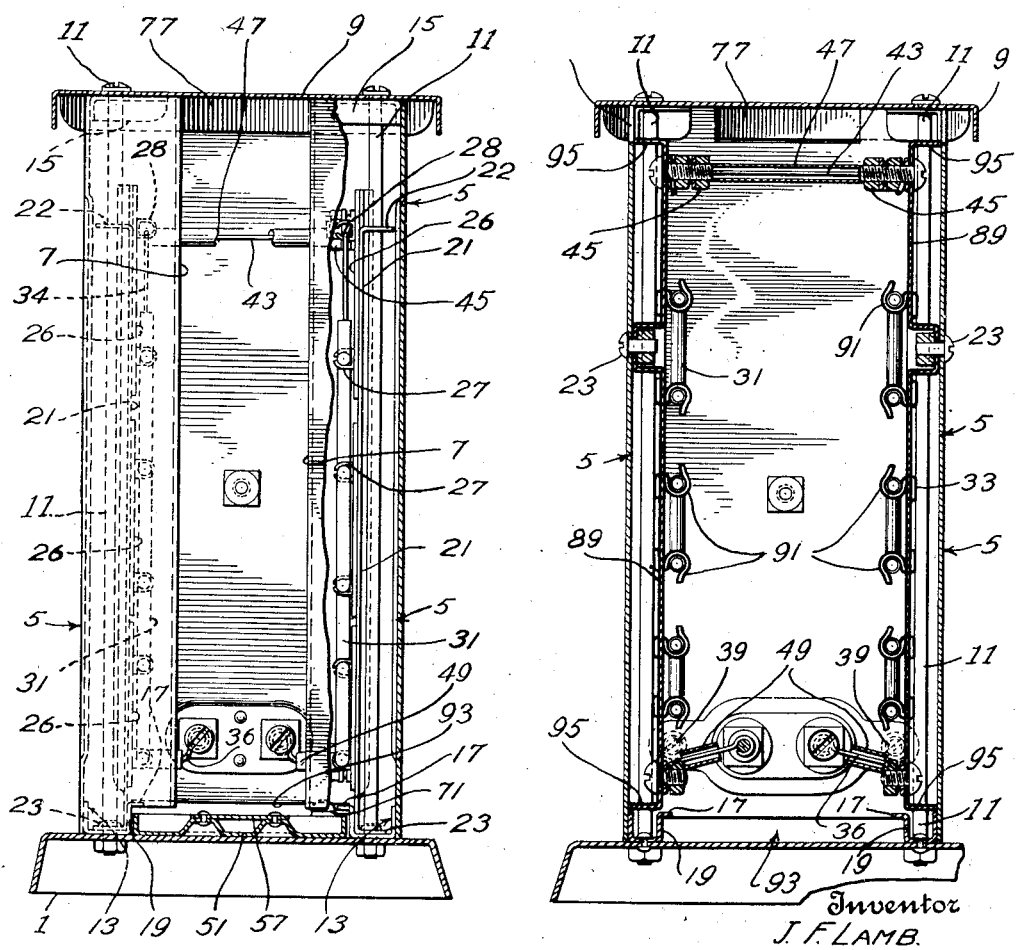

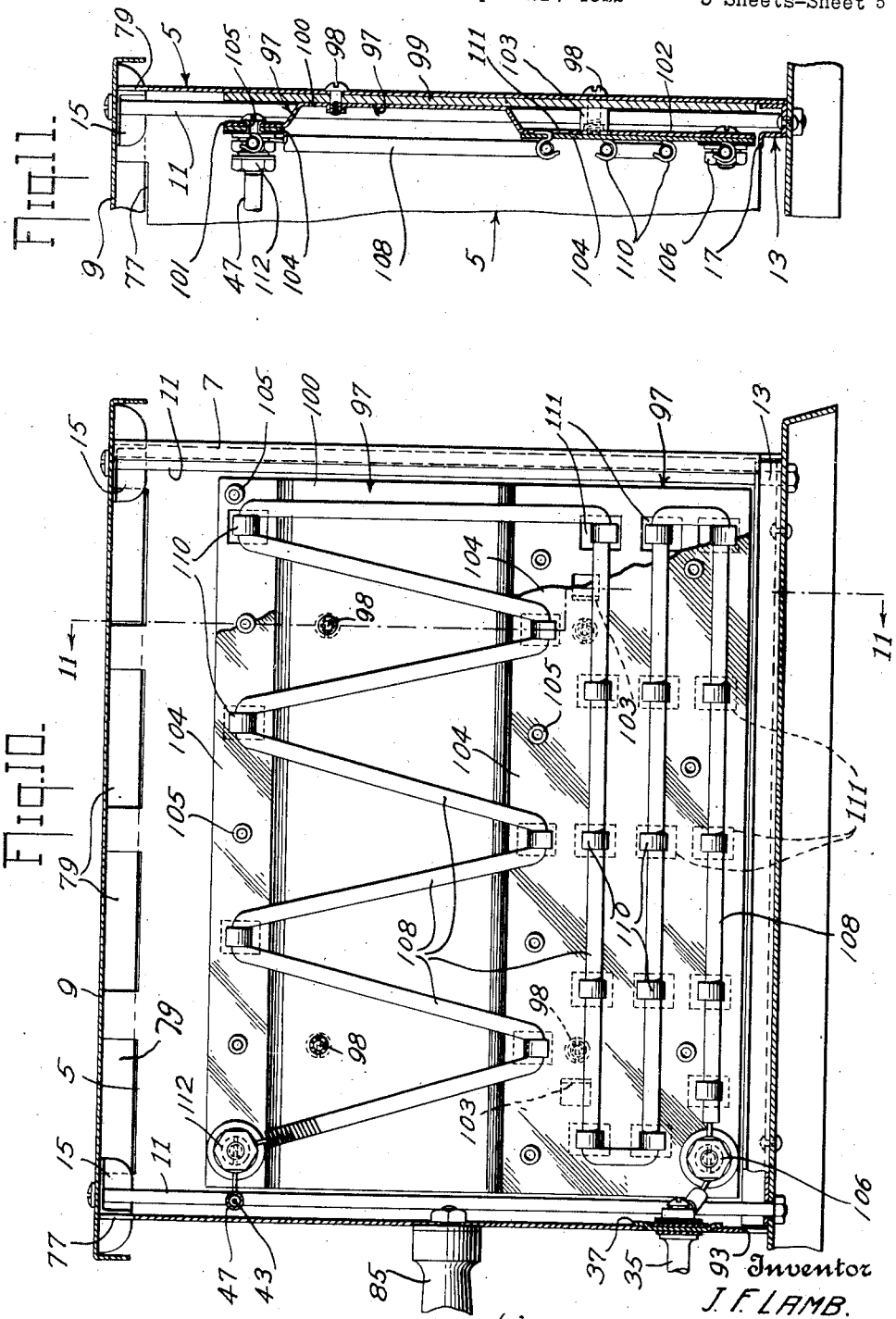

1,480,084

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRIC TOASTER.

Application filed September 21, 1922. Serial No. 589,521.

*To all whom it may concern:*

Be it known that I, JOSEPH F. LAMB, a citizen of the United States, residing at New Britain, county of Hartford, State of Connecticut, have invented certain new and useful Improvements in Electric Toasters, of which the following is a full, clear, and exact description.

My invention relates to electric toasters and has for its object to provide a new and improved toaster which will toast more quickly and keep the toast warm and which has various other advantages and novel features as hereinafter more clearly set forth.

The following is a description of a toaster embodying my invention, reference being had to the accompanying drawings, in which, Figure 1 shows a longitudinal vertical section of a heating chamber of the toaster with the toast rack inserted therein;

Fig. 2 is a vertical transverse section on the line 2—2, Fig. 1;

Fig. 3 shows the housing in section as in Fig. 1 with the toast rack partially withdrawn;

Fig. 4 is a vertical longitudinal section of the toast rack on the line 4—4, Fig. 5;

Fig. 5 is a section of the toast rack on the line 5—5, Fig. 4;

Fig. 6 is a detail of the lower rear portion of the toast rack;

Fig. 7 is a section on the line 7—7, Fig. 4;

Fig. 8 is a section on the line 8—8, Fig. 3;

Fig. 9 is a section similar to that of Fig. 2 with the rack removed showing a modified construction of the casing;

Fig. 10 is a longitudinal sectional elevation showing particularly one form of heating unit that may be employed in the improved toaster; and Fig. 11 is a sectional view, taken on the line 11—11 of Fig. 10.

Referring more particularly to the drawings, 1 is a downwardly flanged base plate having non-metallic legs 3. Carried by the base plate is a housing 5 having at one end an opening or door 7 and a top plate 9 which with said base constitute a heat-retaining casing. The side walls of this housing are preferably formed from one continuous sheet of metal starting on one side of the door 7 and extending around four sides to the other side of the door. The top plate 9 is secured in position by bolts 11 which extend therethrough and through the base, being located in the four corners of the side walls and holding the portions together. Adjacent to the lower edges of the side walls are U-shaped members 13 through the ends of which pass the bolts 11. The upper portions of the side walls are held in position relatively to the top 9 by three sided angle irons 15 which are brazed or welded to the top plate 9 and which fit within the corners of the side walls. The inner sides of the members 13 at their upper ends are bent at a right angle so as to project inwardly, forming flanges 17 which act as guides for the crumb tray hereinafter described. The vertical sides 19 also act as guiding surfaces for the crumb tray.

Secured within the housing are two vertical metal plates 21 having outturned portions constituting lugs 22 adjacent to their upper corners but somewhat removed from their upper ends and having outturned flanges 23 along their lower edges. Through these lugs and flanges the bolts 11 pass, holding the plates in vertical position and spaced away from the inner sides of the casing.

The plates are secured to the base by screws 24 passing through the bottoms of the U-shaped members 13 and entering the flanges 23, thus securing the U-shaped members also. In this way the securing means, except for the heads of the bolts 11, are concealed so that the case can be given a fine and elegant appearance.

Supported by these plates 21 and secured thereto by eyelets 25 are sheets of mica 26, which form insulating supports for the heating elements 31 and also constitute reflecting surfaces. The mica sheets are provided with a series of hooks 27 which have eyelet bases from which rise two arms 28. The hooks are secured to the mica sheets in the same manner as ordinary eyelets, being passed through holes and having their ends upset. The prongs 28 which constitute the arms of a U-shaped structure are bent around the heating element as it is put in place, securely holding it in position. In order that there shall be no electrical connection between the hooks and the plate 21 the plate is provided with a series of holes 29 in alinement with the eyelet hooks as shown in full and dotted lines in Fig. 1. The plates 21 are provided with vertical outwardly extending corrugations 30 to keep them from warping.

The lower portions of the heating elements 31 are of the ordinary helical type. The upper strand, however, is a single uncoiled wire 34 as shown in Figs. 1 and 3 so as to reduce the heating effect at that point.

The free ends of the resistance conductors on each support terminate on the inner upper and lower corners of those plates being secured to binding posts 45. The two upper ends are electrically connected together by a conductor 43 which is also secured to said posts 45 so as to form a continuous heating element. The conductor 43 is surrounded by an insulating tube 47 covering its intermediate portion. The connections 36 between the lower ends of the resistance elements and the plug terminals 35 are surrounded by similar insulating tube sections 49.

The plug terminals 35 are carried by the casing, being insulated therefrom and from each other by mica or the like. The plugs are held in place by external nuts 37, with the result that the plugs, resistance elements 31, and the supports 21 can be entirely assembled before they are introduced into the housing. When so assembled they are introduced and secured in place by the bolts 11 and nuts 37, and screws 24 as shown.

Within the casing thus formed is a vertical toast rack having a base 51 in the form of a tray whose outer upturned edges slide in close contact with the vertical guiding surfaces 19 of the members 13 and whose upper edges are overhung by the flanges 17. The tray and toast rack are therefore, positively guided so as to move in a definite rectilineal path properly spaced away from the heating elements. This rack has a frame comprising wire supports 53 secured to the front plate 55 and a rear plate 57 secured to the tray and wire side members 59 having their lower portions formed with hooks 61 bent beneath spacing flanges 63 on a raised carrier plate 65 and secured at their upper ends to the wire 53 by brazing or the like. The rack also comprises spring toast holding members 67 whose lower ends are bent inward as shown in Fig. 5 and held by clamping plates 69 riveted to the carrier plate from which the flanges 63 extend. This carrier plate is secured to the plate 55 and 57 and by them to the crumb tray 51. These spring members 67 properly center any sizes of toast which are not thick enough to be centered by the rigid side members 59. The crumb tray is provided at its rear end with an upwardly extending projection 71, which as shown in Fig. 8 engages one lower end of the front face of the casing at the side of the door, the casing at that end portion being spaced away from the base a distance equal to the normal height of the crumb tray. This prevents the crumb tray from being accidentally separated from the casing, and automatically stops the movement of the crumb tray when pulled out as shown in Fig. 3, at which time the rack will be supported by the engagement of the crumb tray with the lower portions of the front wall and with the forward portion of the base. The crumb tray can be entirely separated by swinging it sidewise so that the lug can be slipped through the door 7 or by canting the crumb tray upwards. If it is desired, the crumb tray may be stopped with the rear plate 57 in line with the front wall of the casing, which will result in substantially closing the door of the casing and thus act to conserve the heat therein. When the rack is in normal position the plate 55 closes the door of the casing except for a slight opening at the top which is advisable for ventilation purposes. Spaced away from the plate 55 by the bent edges 72 is a cover plate 75 which laps over the edges of the door. An opening 77 is formed in the upper end of the rear wall of the casing for ventilation, as shown in Figs. 1 and 2. A longitudinally extending series of openings 79 is provided along the upper portion of each side of the casing, resulting in circulation of air tending to make the degree of heat more uniform in all parts of the casing and permitting excess heat to escape.

The heating elements preferably are formed in horizontal loops and the loops so formed are spaced away from each other, the spaces increasing from bottom to top so as to obtain a more uniform distribution of heat, since the heat naturally rises so that it takes less heating surface at the top to secure the same internal temperature.

The rack is provided with a handle 83 and preferably the opposite end of the casing is provided with a similar handle 85, the two handles forming a convenient means of lifting the toaster when desired.

The lower rear end of the casing has a slot 93 which is closed by the rear end of the crumb tray when the crumb tray is fully inserted, as shown in Fig. 1.

In the modification shown in Fig. 9 the supports are made of metal 89 carrying directly connected supporting hooks 91 in which the elements are mounted. These metal supports 89, together with the hooks 91, are assembled as shown and then immersed in an insulating enamel bath which coats the sides of the plate with a reflecting surface and also covers the hooks 91 with insulation so that the heating element mounted thereon has its various turns insulated from one another and the metallic support although the hooks themselves may be electrically connected to the body of the plate 89. These plates 89 have their upper and lower edges bent outwardly as shown at 95 so as to be spaced away from the outer wall of the casing and in this construction the bolts 11 preferably pass through these spacing flanges. In this form the members 13 are free from the side walls and are riveted to the base as shown.

In the construction shown in Figs. 10 and 11, the heating unit comprises a sheet metal plate 97 which is secured to the side wall of the toaster by screws 98, a sheet 99 of asbestos being interposed between the plate 97 and the side wall. The supporting plate 97 is provided with a depressed portion 100 extending longitudinally thereof, which is laid against the asbestos sheet 99 so as to form supporting portions 101 and 102 spaced from the asbestos sheet and the side walls, the supporting portion 102 having spacing lugs 103 stuck out therefrom, the ends of which engage the asbestos sheet 99. The supporting portion 102 is of considerably greater width than the portion 101, and both are covered by sheets of mica 104 which are secured to the plate by eyelets 105. A binding post 106 is mounted on and insulated from the supporting portion 102 at the lower left hand corner thereof, viewing Fig. 10, and is connected with the plug terminal 35. One end of a heating conductor 108 is secured to the binding post 106 and the conductor is carried back and forth in loops longitudinally over the supporting portion 102 and is held thereon by hooks 110 secured to the mica sheet 104 opposite holes 111 in plate 97 so as to be insulated therefrom, there being three horizontal stretches of the heating conductor extending substantially the length of the portion 102. The heating conductor is then carried across the forward end of the depressed portion 100 of the plate 97 and looped over a hook 110 secured to the mica sheet 104 on the supporting portion 101 of the plate. The conductor is then looped alternately over hooks 110 on the mica sheets on the supporting portions 102 and 101 of said plate and its end secured to a binding post 112 which is mounted on and insulated from the left hand end of the supporting portion 101 of the plate 97, the binding post being connected by the conductor 43 to the corresponding binding post on the associated heating unit (not shown) of the toaster. It will be apparent that this form of heating unit is simple, strong and durable in construction.

In the toaster as above described on account of the complete enclosure of the toast in a heat retaining container the toast is made under a hotter heat, resulting in hotter toast. It is also made more quickly. The toast can be kept warm for a considerable time even when the current is disconnected. The holder has a crumb tray which prevents the scattering of crumbs, and which automatically ejects through the rear opening 93 crumbs which may have gotten into the bottom of the container. The heating element with its supports and terminals can be completely assembled before it is applied to the casing. The connection between the two portions of the heating element is at a point where it is out of the way, viz: at the top and rear end and is furthermore insulated so that electrical contact with it can not be made. The inner ends of the terminals 35 are spaced away from the back plate 55 of the rack so that they can not be short-circuited thereby, the limit of movement of the rack being defined by the engagement of the front plate 75 with the portions adjacent the door of the housing.

After the crumb tray has been moved to the position shown in Fig. 3 it can be moved so as to disengage its retaining lugs 71 and can then be easily separated. The use of the vertical rack with the elements on both sides results in proper spacing of the toast from the heating elements without relation to the thickness of the toast.

As will be evident to those skilled in the art, my invention permits of various other modifications without departing from the spirit thereof or the scope of the appended claims.

What I claim is:

1. An electric toaster having a heat retaining casing provided with a door, heating conductors supported therein and lying in two vertical planes, a vertical toast holding rack movable through said door to and from the space between said planes, and a crumb tray beneath said rack and extending beyond the sides thereof, said door having lateral extensions at its bottom portion so as to conform substantially to the outline of the upper portion of said rack and admit said tray.

2. An electric toaster having a heat retaining casing provided with a door, heating conductors supported therein and lying in two vertical planes, a vertical toast holding rack movable through said door to and from the space between said planes, and a crumb tray beneath said rack and extending beyond the sides thereof, said door having lateral extensions at its bottom portion so as to conform substantially to the outline of the upper portion of said rack and admit said tray, said casing having an opening in its rear face, in line with said extensions adapted to be closed by said tray when fully inserted.

3. An electric toaster having a heat retaining casing provided with a door, heating conductors supported therein and lying in two vertical planes, a vertical toast holding rack movable through said door to and from the space between said planes, and a crumb tray supporting said rack and extending beyond the sides thereof, said door having lateral extensions at its bottom portion so as to conform substantially to the outline of the upper portion of said rack and admit said tray, said casing having guiding faces engaged by the edges of said tray so as to direct said tray in a rectilineal path.

4. An electric toaster having a heat retaining casing provided with a door, heating conductors supported therein and lying in two vertical planes, a vertical toast holding rack movable through said door to and from the space between said planes, and a crumb tray supporting said rack and extending beyond the sides thereof, said door having lateral extensions at its bottom portion so as to conform substantially to the outline of the upper portion of said rack and admit said tray, said tray and said casing having on their rear and front portions respectively parts adapted to engage when said tray is in its outer position so as to limit further outward movement of said tray.

5. An electric toaster having a heat retaining casing provided with a door, heating conductors supported therein and lying in two vertical planes, and a vertical toast holding rack movable through said door to and from the space between said planes, said heating conductors having horizontal loops.

6. An electric toaster having a heat retaining casing provided with a door, heating conductors supported therein and lying in two vertical planes, and a vertical toast holding rack movable through said door to and from the space between said planes, said heating conductors having horizontal loops, the lower loops being of helically wound wire and the upper loop of substantially straight wire.

7. An electric toaster having a casing, a removable and replaceable unit comprising two supports adapted to be secured adjacent to the side walls of said casing, heating conductors carried by said supports and connected together, and plug terminals connected to the free ends of said conductors and adapted to be secured to the inner end of said casing, and means for detachably securing said supports and said terminals to said inner end and within said casing respectively so as to hold the parts of said unit in their proper positions.

8. An electric toaster having a heat retaining casing provided with a door, heating conductors supported therein and lying in two vertical planes, and a vertical toast holding rack movable through said door to and from the space between said planes, terminals on the side of said casing opposite said door, said terminals having exposed inner ends to which said conductors are connected and said rack being movable toward and from the inner ends of said plug terminals, and means carried by said rack engaging said casing so as to limit the inward movement of said rack before it reaches said inner ends of said terminals.

9. In an electric toaster a rack comprising vertical end members, a plate connected to the lower ends of said members, two spacing members connecting their upper ends, and upright loops having their lower ends open and hooked beneath said plate and their upper ends closed and secured to said spacing members.

10. An electric toaster having a heat retaining casing provided with a door, heating conductors supported therein and lying in two vertical planes, and a vertical toast holding rack movable through said door to and from the space between said planes, the sides of said casing having a longitudinally extending series of ventilating openings adjacent to the top portion thereof.

11. In a toaster a housing consisting of a strip forming three sides of a casing, heating elements supported within said housing and adjacent to the two opposite sides thereof, a base and cover portion for said housing, bolts extending through said cover and base and within said housing holding said base, cover and housing together, said housing having at one end an opening constituting a door for inserting and removing the material to be toasted.

12. In a toaster a housing consisting of a strip forming three sides of a casing, heating elements supported within said housing and adjacent to the two opposite sides thereof, a base and cover portion for said housing, bolts extending through said cover and base and within said housing holding said base, cover and housing together, and supports for said heating elements having outwardly turned perforated portions through which bolts extend, said housing having at one end an opening constituting a door for inserting and removing the material to be toasted.

13. An electric toaster having a casing comprising sides, top and bottom plates, two guides adjacent to said bottom plate and also adjacent to said sides, two supports extending parallel to said sides and having lower outturned flange portions engaging said guides and upper outturned lug portions, bolts passing through said top and bottom plates and located within the corners of said casing, said bolts passing through the top and bottom outturned portions of said supports and through said guides, and screws passing through said bottom plate and guide and into the lower flanges of said support so as to secure said support as well as said guides within said casing.

14. In an electric heater the combination of a metallic support having a plurality of openings, a sheet of refractory insulating material secured thereto, a series of retaining hooks extending through said sheet in alinement with said openings so as to be supported by said sheet but electrically separated from said metallic support and a heating element carried by said hooks.

JOSEPH F. LAMB.